United States Patent
Mitsuishi et al.

[11] Patent Number: 5,966,259
[45] Date of Patent: Oct. 12, 1999

[54] MAGNETIC RECORDING MEDIUM FORMED IN A PLURALITY OF TRACKS AND MAGNETIC RECORDING-REPRODUCING APPARATUS FOR THE SAME

[75] Inventors: Tetsuya Mitsuishi; Masayoshi Nakagawa; Makoto Moriya; Takayuki Sugawara; Katsuji Suzuki, all of Iwaki, Japan

[73] Assignee: Alps Electric Co., Ltd., Yokohama, Japan

[21] Appl. No.: 08/852,669

[22] Filed: May 7, 1997

Related U.S. Application Data

[63] Continuation of application No. 08/569,039, Dec. 7, 1995, abandoned.

[30] Foreign Application Priority Data

Dec. 9, 1994 [JP] Japan .................................. 6-306357

[51] Int. Cl.[6] .............................. G11B 5/09; G11B 5/596
[52] U.S. Cl. ......................... 360/48; 360/51; 360/77.08; 360/78.14
[58] Field of Search .......................... 360/135, 48, 77.08, 360/51, 78.04, 78.14

[56] References Cited

U.S. PATENT DOCUMENTS

| | | | |
|---|---|---|---|
| 4,622,601 | 11/1986 | Isozaki et al. | 360/48 |
| 4,977,472 | 12/1990 | Volz et al. | 360/78.14 |
| 5,075,805 | 12/1991 | Peddle et al. | 360/61 |
| 5,170,385 | 12/1992 | Senshu et al. | 360/48 |
| 5,253,124 | 10/1993 | Kondo et al. | 360/48 |
| 5,541,783 | 7/1996 | Yamamoto et al. | 360/48 |

FOREIGN PATENT DOCUMENTS 63-257946  10/1988  Japan .

*Primary Examiner*—Aristotelis M. Psitos
*Assistant Examiner*—Regina Y. Neal
*Attorney, Agent, or Firm*—Brinks, Hofer, Gilson & Lione

[57] ABSTRACT

The present invention relates to a magnetic recording medium and a magnetic recording/reproducing apparatus for the same. In the magnetic recording medium there are provided a read/write region which permits modification of written data and a read-only region dedicated to the reading of data, which is used for reading only once writing is done. In recording servo information to a data format region of the magnetic recording medium, the time width of servo information in the read-only region is set shorter than that in the read/write region.

5 Claims, 2 Drawing Sheets

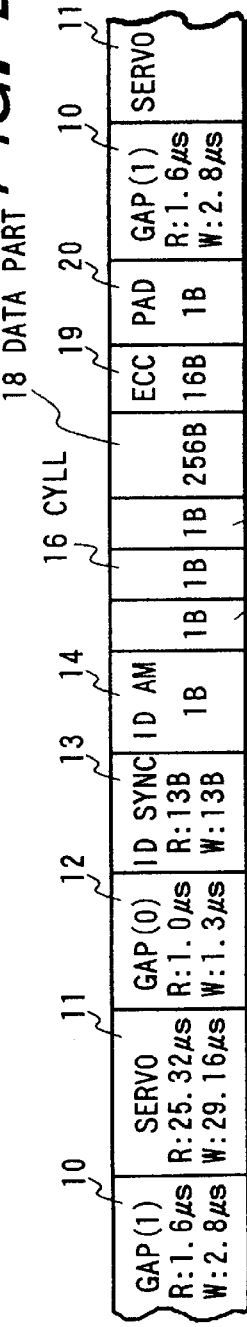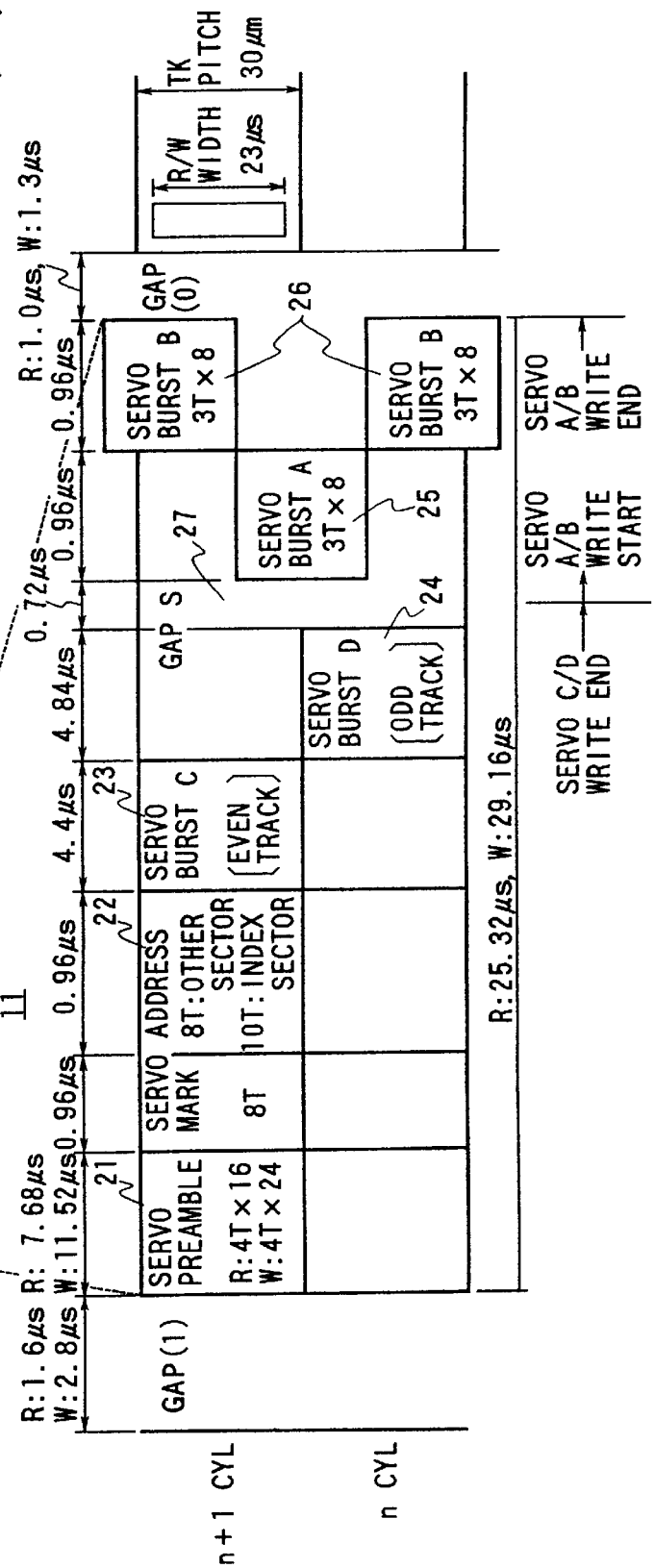

it is a continuation of application Ser. No. 08/569,039, filed Dec. 7, 1995, now abandoned.

MAGNETIC RECORDING MEDIUM FORMED IN A PLURALITY OF TRACKS AND MAGNETIC RECORDING-REPRODUCING APPARATUS FOR THE SAME

This application is a continuation of application Ser. No. 08/569,039, filed Dec. 7, 1995, now abandoned.

BACKGROUND OF THE INVENTION

1. Field of the Invention

The present invention relates to a magnetic recording medium capable of writing and reading digital data, as well as a magnetic recording/reproducing apparatus for the same.

2. Description of the Related Art

In a magnetic recording medium, for example in a floppy disk or a hard disk, digital information is written in a predetermined format using a head, then is read as necessary, and a corresponding processing is executed using a personal computer or the like. These types of magnetic recording mediums are constituted by applying a magnetic material onto the surface of a thin, disk-like, resinous sheet.

Standards have been established for this type of magnetic recording mediums. According to the standards, head tracing paths, called tracks, are prescribed concentrically from the outside toward the center, each track is divided in the circumferential direction, and each divided recording unit is designated a sector. For each sector is prescribed a format comprising an ID field, a gap, a data field and a gap successively in order of writing and reading. Data which has been written in a certain format cannot be read out unless the same format is followed.

In the case of such magnetic recording mediums as a floppy disk and a hard disk, unlike CD-ROM or the like, it is possible to select writing (W) and reading (R) arbitrarily.

In the above prior art, there is no distinction between reading (R) and writing (W), and the magnetic recording medium is employable for both reading and writing. Therefore, track density is set to the same density throughout the whole region thereof. Further, the time width of servo information in a data format is set to the same width for both reading and writing.

Consequently, in the case of reading only, it is not required to take a wide track margin between tracks, which however is set to the same degree as in writing (at the time of writing it is necessary to take the track pitch somewhat large in consideration of both variations in magnetic head characteristics between apparatuses and the follow-up characteristics of a tracking servo mechanism so as to prevent destruction of data caused by interference with data of the adjacent track). This has been an obstacle to the improvement of the memory capacity (track density).

Further, in recording servo information in the data format region, AGC (automatic gain control) is once reset and thereafter the writing of servo information is performed. Therefore, taking the time required for AGC circuit to rise into consideration, it is necessary to set the time width of a servo preamble portion of the servo information, to be relatively long thus resulting in that it is required to make the time width of the servo information long. Also from this point, a difficulty has been encountered in increasing the memory capacity.

SUMMARY OF THE INVENTION

It is a first object of the present invention to provide a magnetic recording medium capable of increasing the memory capacity in a single magnetic recording medium.

It is a second object of the present invention to provide a magnetic recording medium capable of increasing the memory capacity in a read-only region.

It is a third object of the present invention to provide a magnetic recording/reproducing apparatus capable of allocating a memory capacity portion corresponding to a time shortening for servo information to recording use and hence capable of increasing the memory capacity.

Usually, the whole memory region is a read/write region applicable to both reading and writing of data, while according to the present invention, a read-only region is provided in part of the memory region and, once data is written therein, the read-only region is used for reading only. By so doing, various conditions can be made to correspond to reading only, with the result that an increase in the memory capacity in a single magnetic recording medium can be attained.

One means for increasing the memory capacity is the utilization of track density. By setting the track density in the read-only region differently from (same as or larger than) that in the read/write region, it is possible to increase the memory capacity in the read-only region.

In writing, it has heretofore been required to take long the time width of the servo preamble portion because it is necessary to take the rising time of the AGC circuit into consideration at the time of writing servo information. On the other hand, in the presence of the read-only region, it is not necessary to consider the problems peculiar to the AGC circuit, and even if the time width of servo information is shortened, there will arise no problem. According to the present invention, therefore, the time width of servo information in the use of the read-only region is made shorter in recording than that of servo information in the use of read/write region. As a result, a memory capacity portion corresponding to the shortening of time can be allocated to recording use, thus making it possible to increase the memory capacity.

BRIEF DESCRIPTION OF THE DRAWINGS

FIG. 2(a) is an explanatory view showing an example of data format in magnetic recording and FIG. 2(b) is an explanatory view showing in what state servo information is recorded.

DESCRIPTION OF THE PREFERRED EMBODIMENTS

Embodiments of the present invention will be described hereinunder with reference to the accompanying drawings.

Figure 1:
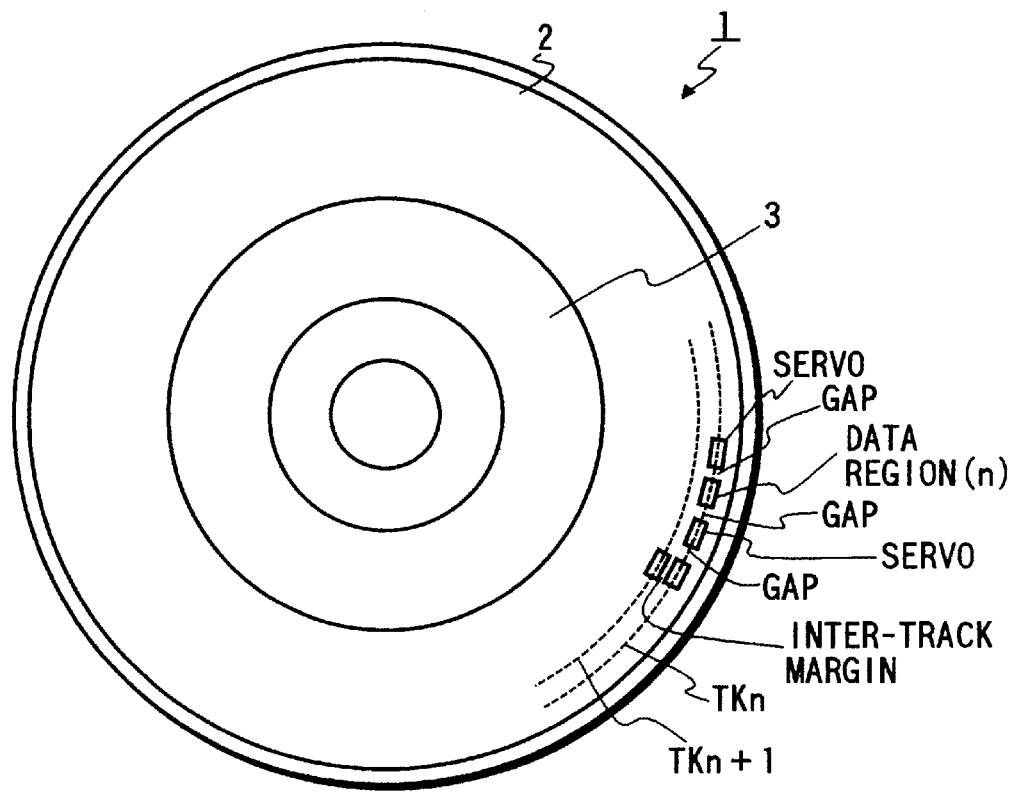
FIG. 1 is a schematic construction diagram showing a magnetic recording medium according to the present invention.

As shown in FIG. 1, a magnetic recording medium 1 is in the form of a disk, and recording (writing) and reading of information with a head are performed in the circumferential direction and from the outside toward the center under rotation of the magnetic recording medium 1.

The magnetic recording medium 1 is provided with an R/W (read/write) region 2 which permits writing and reading of information and is also provided with a read-only region 3 which is formed inside the R/W region 2. The read-only region 3 is subjected to writing only once and thereafter it is used only for reading the written information.

Although in this embodiment the R/W region 2 is provided outside, it may be provided inside and the read-only region 3 outside. As to the proportions (region ratio) of the two, it can be set appropriately.

The track density in the read-only region 3 is set higher than the track density in the R/W region 2. That is, the track pitch in the read-only region 3 is higher than that in the R/W region 2.

Consequently, since there does not occur destruction of data in an adjacent track, a small intertrack margin suffices for preventing such destruction and hence the memory capacity of the read-only region 3 can be increased by making the track pitch dense.

The track pitch of the R/W region 2 and that of the read-only region 3 may be set equal to each other. In this case, the characteristics of the read-only region 3 can be improved by making the writing width of the magnetic head used for writing to the read-only region 3 wider than that of the R/W region 2.

Referring to FIGS. 2(a) and 2(b), the reference numeral 10 denotes Gap (1), the numeral 11 denotes Servo, numeral 12 Gap (0), numeral 13 ID SYNC, 14 IDAM, 15 Head CylH, 16 CylL, 17 Sector, 18 Data Part, 19 ECC, 20 Pad, 21 Servo Preamble portion, 22 Servo Address Mark, 23 Servo Burst C, 24 Servo Burst D, 25 Servo Burst A, 26 Servo Burst B, and 27 denotes Gap S.

As shown in FIG. 2(a), on each track are provided Gap (1) 10 for the protection of data and servo region, Servo 11, and, as data (user data) region, ID SYNC 13, IDAM 14, Head CylH 15, CylL 16, Sector 17, Data Part 18, ECC 19 and Pad 20 through Gap (0) 12 which is for the protection of data and servo region. Subsequent to the data region is provided Gap (1) 10. The R/W width is 23 μm and the track pitch is 30 μm.

In this format, the time width in reading and that in writing are different from each other. For example, in Gap (1) 10, the time width in reading is 1.6 μs and that in writing 2.8 μs, in Servo 11 the time width in reading is 25.32 μs and that in writing 29.16 μs, and in Gap (0) the time width in reading is 1.0 μs and that in writing 1.3 μs.

In Servo 11, as shown in FIG. 2(b), there are provided Servo Preamble portion 21, Servo Address Mark 22, Servo Burst C 23, Servo Burst D 24, Servo Burst A 25, and Gap S 27. Servo Preamble portion 21, the time width in reading is 7.68 μs and that in writing 11.52 μs.

In this embodiment, for example, the time width of Servo 11 of the R/W region 2 shown in FIG. 1 is set at 29.16 μs, and the time width of Servo 11 of the read-only region 3 shown in FIG. 1 is set at 25.32 μs, to shorten the entire time width of the servo information region (Servo 11).

This shortening is realized by shortening the time width of Servo Preamble portion 21 to 11.52 μs in reading and writing at the R/W region 2 and to 7.68 μs in reading at the read-only region 3. Further, the gap time in reading can be shortened because such a long latency time as in writing is not required. Consequently, the time widths in the gap portions 10 and 12 are shortened to 2.8 μs and 1.3 μs at the R/W region 2 and to 1.6 μs and 1.0 μs at the read-only region 3 respectively.

Thus, since the time width of servo information at the read-only region 3 is made shorter than that in the R/W region 2, it is possible to increase the density of the data format region in the read-only region 3 and hence possible to increase the memory capacity. In combination with the foregoing increase in track density of the read-only region 3 it is made possible to further increase the memory capacity.

For example, the read-only region 3 can be utilized for the storage of program to operate the apparatus and for the recording of cipher information to protect copy.

Figure 3:
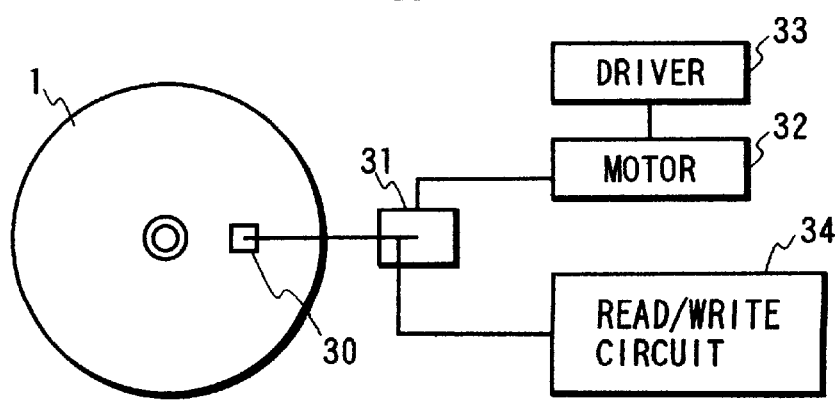
FIG. 3 is a block diagram showing the construction of a magnetic recording/reproducing apparatus according to the present invention.

In FIG. 3, the reference numeral 1 denotes a magnetic recording medium which is disk-like, the numeral 30 denotes a magnetic head, numeral 31 denotes a carriage with the magnetic head 30 carried thereon, 32 denotes a drive motor for moving the carriage 31, 33 denotes a driver for controlling the drive motor 32, and 34 denotes a read/write circuit which is connected to the magnetic head 30.

While being controlled by the driver 33, the magnetic head 30 traces each track on the magnetic recording medium 1 to read or write data.

Though not shown, there is provided a spindle motor for rotating the magnetic recording medium 1. Further provided are a driver circuit (not shown) for controlling the spindle motor, and a servo circuit. Through the magnetic head 30 the servo circuit reads the servo information recorded on the magnetic recording medium 1, then generates a circuit control signal in accordance with the servo information, and supplies the signal to the driver circuit.

Although in the above embodiments, reference has been made to a floppy disk as an example of the magnetic recording medium, no limitation is placed thereon, but the present invention is applicable to all of the magnetic recording mediums belonging to the category of magnetic recording mediums and so far used as R/W only mediums.

Further, although in the above description, the time width of servo information has been shown in terms of concrete numerical values, these values are a mere example and it goes without saying that modifications may be made.

In the embodiments constructed as above, since the magnetic recording medium 1 which permits writing and reading of data comprises the read/write region 2 permitting modification of written data and the read-only region 3 used for reading only after writing of data, it is possible to increase the memory capacity in a single magnetic recording medium 1.

Further, since the track density of the read-only region 3 is set equal to or higher than that of the read/write region 2, it is possible to increase the memory capacity in the read-only region 3.

In the above embodiments, moreover, at the time of recording servo information in the data format region of the magnetic recording medium 1, the time width of servo information in the read-only region 3 is set shorter than that in the read/write region 2, so a memory capacity portion corresponding to the shortened time of servo information can be allocated to recording use and hence it becomes possible to increase the memory capacity.

What is claimed is:

1. A magnetic recording medium comprising magnetic material formed into a plurality of tracks, each of the plurality of tracks having a circumferential length and including a servo region formed in a predetermined portion of the circumferential length;

wherein said plurality of tracks include at least one read/write track including a servo region having a servo region length measured along the circumferential length of the read/write track, and at least one read-only track including a servo region having a servo region length measured along the circumferential length of the read-only track;

wherein the servo region length of the read/write track is greater than the servo region length of the read-only track.

2. A magnetic recording medium according to claim 1, wherein said at least one read/write track comprises a plurality of read-write tracks collectively forming a read-write region, wherein said at least one read-only track comprises a plurality of read-only tracks collectively forming a read-only region, and wherein track density of said read-only region is equal to or higher than a track density of said read/write region.

3. A magnetic recording/reproducing apparatus comprising:

a magnetic recording medium; and a magnetic head for reading from and writing to the magnetic recording medium;

wherein the magnetic recording medium includes magnetic material formed into a plurality of tracks, each of the plurality of tracks having a circumferential length and including a servo region including a servo preamble portion formed in a predetermined portion of the circumferential length;

wherein a first group of said plurality of tracks form a read/write region, each track of the first group including first servo information having a first length measured along the circumferential length of said each track, and including a first servo preamble portion, wherein a second group of said plurality of tracks form a read-only region including second servo information having a first length measured along the circumferential length of said each track, and including a second servo preamble portion, and wherein a time width for reading the second servo preamble information by the magnetic head is less than a time width for reading the first servo preamble information whereby a time width for reading the second servo information by the magnetic head is less than a time width for reading the first servo information.

4. A magnetic recording/reproducing apparatus according to claim 3, wherein a track density of said read-only region is equal to or higher than a track density of said read/write region.

5. A magnetic recording medium comprising magnetic material formed into a plurality of tracks, wherein a track pitch is defined by a spacing between adjacent tracks of the plurality of tracks;

wherein said magnetic recording medium includes a read/write region formed by a first group of said plurality of tracks, and a read-only region formed by a second group of said plurality of tracks; and wherein a first track density of said read-only region is greater than a second track density of said read/write region.

* * * * *